United States Patent
Cheung

(10) Patent No.: US 7,503,820 B2
(45) Date of Patent: *Mar. 17, 2009

(54) MULTI-LAYERED SPORTS BOARD

(76) Inventor: Wah Kan Cheung, 18 Bilberry Crescent, Richmond Hill, Ontario (CA) L4S 2M4

( * ) Notice: Subject to any disclaimer, the term of this patent is extended or adjusted under 35 U.S.C. 154(b) by 0 days.

This patent is subject to a terminal disclaimer.

(21) Appl. No.: 10/958,913

(22) Filed: Oct. 5, 2004

(65) Prior Publication Data

US 2006/0073325 A1   Apr. 6, 2006

(51) Int. Cl.
    *A63C 5/03* (2006.01)
(52) U.S. Cl. .................. 441/74; 441/65; 428/316.6; 428/319.3; 428/319.7; 428/317.1; 428/317.7
(58) Field of Classification Search ............. 428/316.6, 428/317.1, 319.3, 319.7, 317.7; 441/65, 441/74

See application file for complete search history.

(56) References Cited

U.S. PATENT DOCUMENTS

| | | | | |
|---|---|---|---|---|
| 4,737,548 A * | 4/1988 | Kojima et al. | ............... | 525/193 |
| 4,850,913 A * | 7/1989 | Szabad, Jr. | .................. | 441/65 |
| 5,211,593 A * | 5/1993 | Schneider et al. | ............. | 441/65 |
| 5,217,812 A | 6/1993 | Lee | | |
| 5,658,179 A | 8/1997 | Glydon et al. | | |
| 6,054,005 A | 4/2000 | Hurley et al. | | |
| 6,303,685 B1 * | 10/2001 | Groves | ....................... | 524/527 |
| 6,358,599 B1 * | 3/2002 | Deibel et al. | ............. | 428/308.4 |
| 6,988,920 B2 * | 1/2006 | Yeh | .............. | 441/65 |
| 7,150,666 B2 * | 12/2006 | Cheung | ....................... | 441/74 |
| 7,246,568 B1 * | 7/2007 | Cheung | ....................... | 114/357 |
| 7,303,454 B2 * | 12/2007 | Cheung | ....................... | 114/357 |
| 7,377,828 B2 * | 5/2008 | Cheung | ....................... | 441/74 |
| 7,404,749 B2 * | 7/2008 | Cheung | ....................... | 441/74 |
| 2003/0127812 A1 * | 7/2003 | Mehrmann et al. | ....... | 280/14.21 |
| 2003/0232210 A1 * | 12/2003 | Haas et al. | | |

(Continued)

FOREIGN PATENT DOCUMENTS

CA      2463445 A1    12/2004

(Continued)

*Primary Examiner*—Hai Vo
(74) *Attorney, Agent, or Firm*—Clement Cheng

(57) ABSTRACT

The invention is directed to a sports board (15). In the preferred embodiment, the sports board comprises a polymer film layer (16) having an outer surface (18) and an inner surface (19), a polyethylene foam layer (23) having first (24) and second (25) outer surfaces, and an extruded adhesive resin layer (20) bonded to the inner surface of the film layer and the first surface of the foam layer. The adhesive resin may be selected from a group consisting of an ethylene and methyl acrylic copolymer and an anhydride-modified polyolefin, and the hydride-modified polyolefin maybe selected from a group consisting of anhydride-modified ethylene vinyl acetate, adhydride-modified low-density polyethylene and anhydride-modified linear low-density polyethylene. In an alternate embodiment, the sports board (102) comprises a polyethylene foam layer (103) having an outer surface (104) and an inner surface (105), a non-polyethylene foam layer (110) having first (111) and second (112) outer surfaces, and an extruded adhesive resin layer (106) bonded to the inner surface of the polyethylene foam layer and the first outer surface of the non-polyethylene foam layer. The non-polyethylene foam layer may comprise expanded polypropylene foam or expanded polystyrene foam.

10 Claims, 7 Drawing Sheets

U.S. PATENT DOCUMENTS

2005/0202737 A1    9/2005   Cheung
2005/0281997 A1*  12/2005   Grah
2006/0228539 A1*  10/2006   Cheung .................. 428/316.6
2007/0264891 A1*  11/2007   Cheung ...................... 441/74

FOREIGN PATENT DOCUMENTS

JP           07070252    A2    3/1995
WO        WO 95/20487   A1    8/1995

* cited by examiner

MULTI-LAYERED SPORTS BOARD

TECHNICAL FIELD

The present invention relates to foam sports boards for recreational use and, more particularly, to a laminated gliding board with improved bonding characteristics.

BACKGROUND ART

Body boards for riding waves and other recreational sports boards made of foam or other floatational material are known in the prior art. In general, such boards are composed of a number of polyethylene foam and polyethylene film layers that are laminated together by heating the layers and then immediately passing them through a pair of nip rollers. Another conventional process of lamination is to apply heat to the film layer with a heated nip roller on the film side and a normal nip roller on the foam side, where the heated nip roller may be a flat roller. In most cases the surface of the heated nip roller contains an engraved pattern of convex and concave area for better heat transfer. Both of these conventional heating processes cause adhesion by the localized collapse and bonding of the foam cells on the surface of the respective layers. The resulting laminate of the polyethylene foam and polyethylene film is then often heat laminated onto a standard foam core.

Because the standard foam core does not have a perfectly flat or planar surface, adhesive contact between the film and foam core is limited to the apexes of the cells on the surface of the foam core. Thus the point of contact is not uniform between the film and foam, but instead the film contacts the points of the outer surface of the core that protrude from the irregular cellular surface of the foam core.

Conventional film lamination method typically use microcellular high density foam sheets to improve the adhesion between the film and foam core. The micro-cellular foam sheet contains smaller peaks and valleys, with the peaks closer together. The surface area of contact between the sheet and foam is thereby increased. However, this kind of structure is still prone to delamination by mechanical contact forces and by the effect of heat and pressure when in use.

While it is known in the prior art that a thin layer of thermal plastic polyethylene film between a polyethylene foam sheet and a polyethylene film can be used to promote lamination, such thin layer of film is generally an unmodified low density polyethylene with limited efficacy.

Accordingly, there is need for adhesively bonded sports boards with improved bonding between layers of different polymeric material having different surface contouring and cellular structure.

DISCLOSURE OF THE INVENTION

With parenthetical reference to the corresponding parts, portions or surfaces of the disclosed embodiment, merely for the purposes of illustration and not by way of limitation, the present invention provides an improved sports board (15) comprising a polymer film layer (16) having an outer surface (18) and an inner surface (19), a polyethylene foam layer (23) having first (24) and second (25) outer surfaces, and an extruded adhesive resin layer (20) bonded to the inner surface of the film layer and the first surface of the foam layer. The adhesive resin may be selected from a group consisting of an ethylene and methyl acrylic copolymer and an anhydride-modified polyolefin, and the hydride-modified polyolefin may be selected from a group consisting of anhydride-modified ethylene vinyl acetate, adhydride-modified low-density polyethylene and anhydride-modified linear low-density polyethylene. The polyethylene foam layer may be selected from a group consisting of polyethylene, cross-linked polyethylene, and a copolymer of ethylene vinyl acetate and polyethylene polymeric material. The film layer may be non-opaque and may further comprise a graphic image (29) printed on the inner surface of the film layer. The board may further comprise a second non-opaque polymer film layer (31) having an outer surface (32) and an inner surface (33), and having a graphic image (46) imprinted on the inner surface of the second film layer, and the inner surface of the second film layer bonded to the outer surface (35) of the first film layer (34). The first film layer may have a thickness of between about 0.01 mm and about 0.15 mm and the second film layer may have a thickness of between about 0.02 mm and about 0.15 mm. The board may further comprise a polyethylene film layer (26) bonded to the second outer surface (25) of the foam layer. The board may further comprise a polyethylene foam core (62) having an upper outer surface (63) and a lower outer surface (64), the second outer surface (61) of the foam layer (60) bonded to the upper surface (63) of the foam core (62). The second outer surface and the upper surface may be heat bonded and the foam layer may have a thickness less than the thickness of the core layer. The board may further comprise a second polymer film layer (72) having an outer surface (74) and an inner surface (73), a second polyethylene foam layer (65) having first (68) and second (66) outer surfaces, a second extruded adhesive resin layer (69) bonded to the inner surface of the second film layer and the first surface of the second foam layer, and the second surface of the foam layer bonded to the lower outer surface (64) of the foam core. The board may further comprise a second polymer film layer (99) having an outer surface (101) and an inner surface (100), and a second extruded adhesive resin layer (95) bonded to the inner surface of the second film layer and the lower outer surface (94) of the foam core (92).

The present invention also provides an improved sports board comprising a polymer film layer having an outer surface and an inner surface, a non-polyethylene foam layer having first and second outer surfaces, and an extruded adhesive resin layer bonded to the inner surface of the film layer and the first surface of the foam layer. The non-polyethylene foam layer may comprise expanded polypropylene foam or expanded polystyrene foam.

The invention also provides an improved sports board (102) comprising a polyethylene foam layer (103) having an outer surface (104) and an inner surface (105), a non-polyethylene foam layer (110) having first (111) and second (112) outer surfaces, and an extruded adhesive resin layer (106) bonded to the inner surface of the polyethylene foam layer and the first outer surface of the non-polyethylene foam layer. The non-polyethylene foam layer may comprise expanded polypropylene foam or expanded polystyrene foam. The sports board may further comprise a second polyethylene foam layer (116) having an outer surface (119) and an inner surface (118), and a second extruded adhesive resin layer (113) bonded to the inner surface of the second polyethylene foam layer and the second outer surface (112) of the non-polyethylene foam layer (110). The board may further comprise a polyethylene film layer (120) having an inner surface (121) and an outer surface (122), the inner surface of the polyethylene film layer bonded to the outer surface of the second polyethylene foam layer.

Accordingly, the general object of the present invention is to provide an improved sports board in which different polyolefin materials may be used in the layers without a derogation in bonding strength.

Another object is to provide an improved sports board which permits the layers to be laminated together using more efficient and less expansive laminating methods.

Another object is to provide an improved sports board with improved bond strength and flexibility along the bond line between the laminates.

DESCRIPTION OF THE PREFERRED EMBODIMENTS

Figure 1:
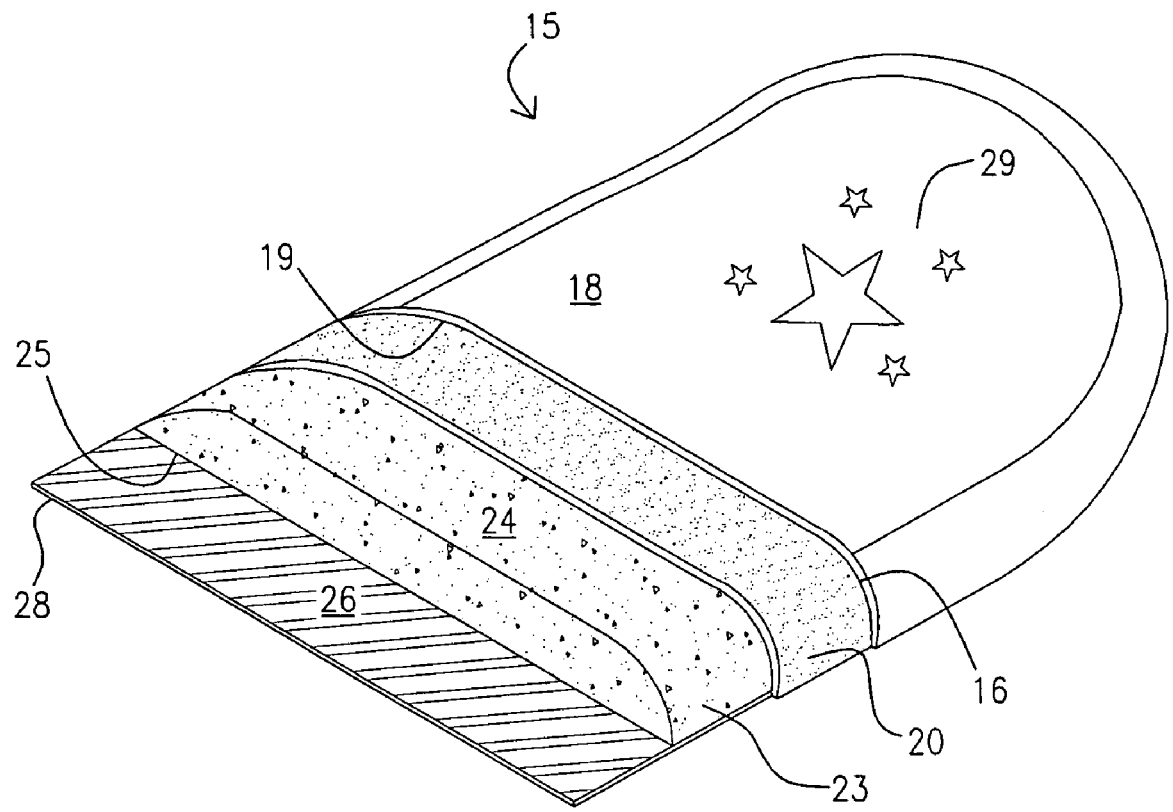
FIG. 1 is a perspective and partial sectional view of a first embodiment of the sports board.

At the outset, it should be clearly understood that like reference numerals are intended to identify the same structural elements, portions or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
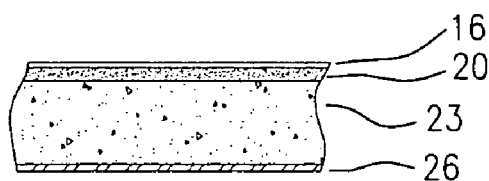
FIG. 2 is a partial vertical sectional view of the sports board shown in FIG. 1.

Referring now to the drawings and, more particularly, to FIG. 1 thereof, this invention provides an improved sports board, the first embodiment of which is generally indicated at 15. As shown in FIGS. 1-2, sports board 15 is comprised of four layers laminated together.

Top Layer 16 is a graphically-imprinted polymer film. The graphics on layer 16 are imprinted using any of several conventional processes for printing. An example of such a process is corona printing, in which an electrical discharge temporarily alters the surface molecules of the polyethylene film, allowing inks to adhere to the film. Layer 16 has a thickness of between 0.02 mm and 0.15 mm, and preferably a thickness of 0.07 mm. Layer 16 has a density in the range of 0.91 to 0.98 g/cm$^3$, and preferably a density of 0.95 g/cm$^3$.

In the preferred embodiment, layer 20 is an ethylene and methyl acrylic copolymer. Layer 20 has a thickness of between 0.02 and 0.15 mm, and preferably a thickness of 0.07 mm. Layer 20 has a density in the range of 0.90 to 0.98 g/cm$^3$, and preferably a density of 0.95 g/cm$^3$. The ethylene methyl acrylate copolymer EMAC provided by Eastman Chemical Company, of 100 North Eastman Road, Kingsport, Tenn. 37662, may be employed in the preferred embodiment. It is contemplated that alternative adhesive resins, such as anhydride-modified polyolefin, anhydride-modified ethylene vinyl acetate, anhydride-modified low-density polyethylene, and anhydride-modified linear low-density polyethylene, maybe employed. The Bynel® adhesive resin, provided by Dupont Packaging, of 1007 Market Street, Wilmington, Del. 19898, maybe employed in such an embodiment.

Layer 23 is closed-cell polyethylene foam, and acts as the core of board 15. Core 23 may be beaded type, extruded type or cross-linked polyethylene foam. Core 23 has a thickness of between 0.5 and 2 inches and preferably a thickness of 1 inch. Core 23 has a density in the range of 1.6 to 4 lb/ft$^3$, and preferably a density of 2.2 lb/ft$^3$. It is contemplated that core 23 may be formed from two or more layers laminated together to provide the appropriate thickness.

Layer 26 is polyethylene film. Layer 26 has a thickness of between 0.2 and 1.5 mm, and preferably a thickness of 0.35 mm. Layer 26 has a density in the range of 0.91 to 0.98 g/cm$^3$, and preferably a density of 0.95 g/cm$^3$.

Figure 12:
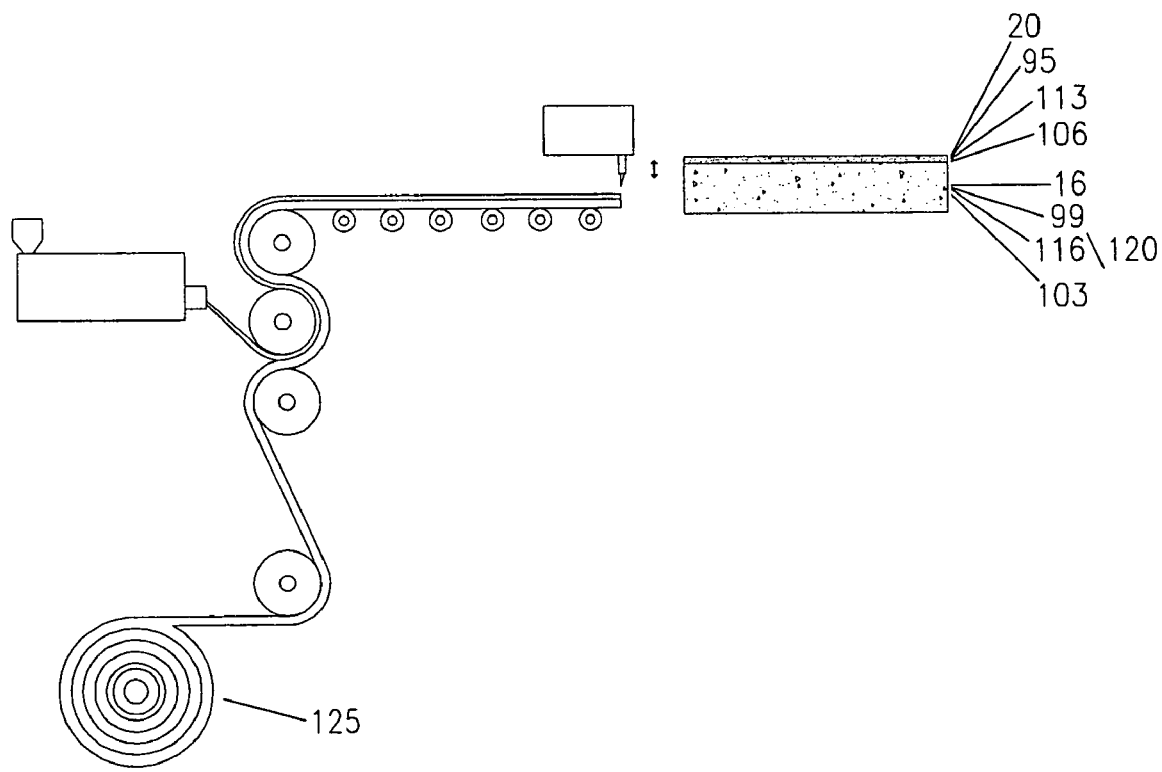
FIGS. 12-13 are a schematic showing the process by which a first foam layer is laminated to a second foam layer with an adhesive resin of the preferred embodiments.

Board 15 is formed in a series of steps. First, layer 26 is heat laminated to the bottom surface 25 of layer 23 using a conventional heat lamination method. The resulting laminate 23/26 is then cut and configured to the desired shape. Next, layer 16 is imprinted with the desired graphics using a conventional imprinting procedure. As shown in FIG. 12, layer 16 is then fed from a bottom roll 125 and hot resin 20 is extruded and with pressure applied to surface 19 of layer 16 to form a top laminate of layers 16 and 20. This top laminate 16/20 is then turned over and, with the application of heat and pressure, is laminated to the upper surface 24 of the shaped core 23, thereby forming the fully-laminated board 15. Layers 16 and 20 are cut and configured to wrap-around and cover the sloped edge of core 23 and the straight edge of layer 26 to form a contoured side to board 15.

Figure 14:
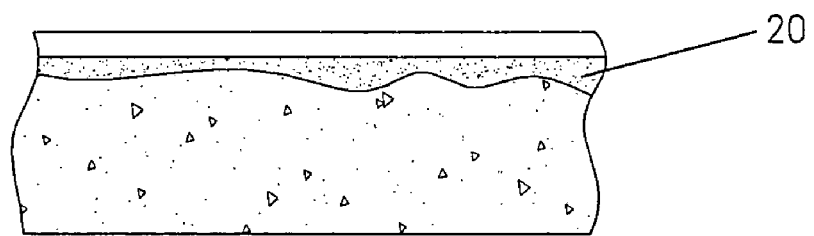
FIG. 14 is an enlarged sectional view of adhesive resin between two different layers.

As shown in FIG. 14, the adhesive resin in this embodiment, as well as the following embodiments, fills in the gaps between the peaks and valleys of each of the opposed surfaces of the two adjacent layers to provide greater contact and better bonding. The extruded resin between two layers of different polymeric material having different surface contouring and cellular structure provides an improved lamination.

Figure 3:
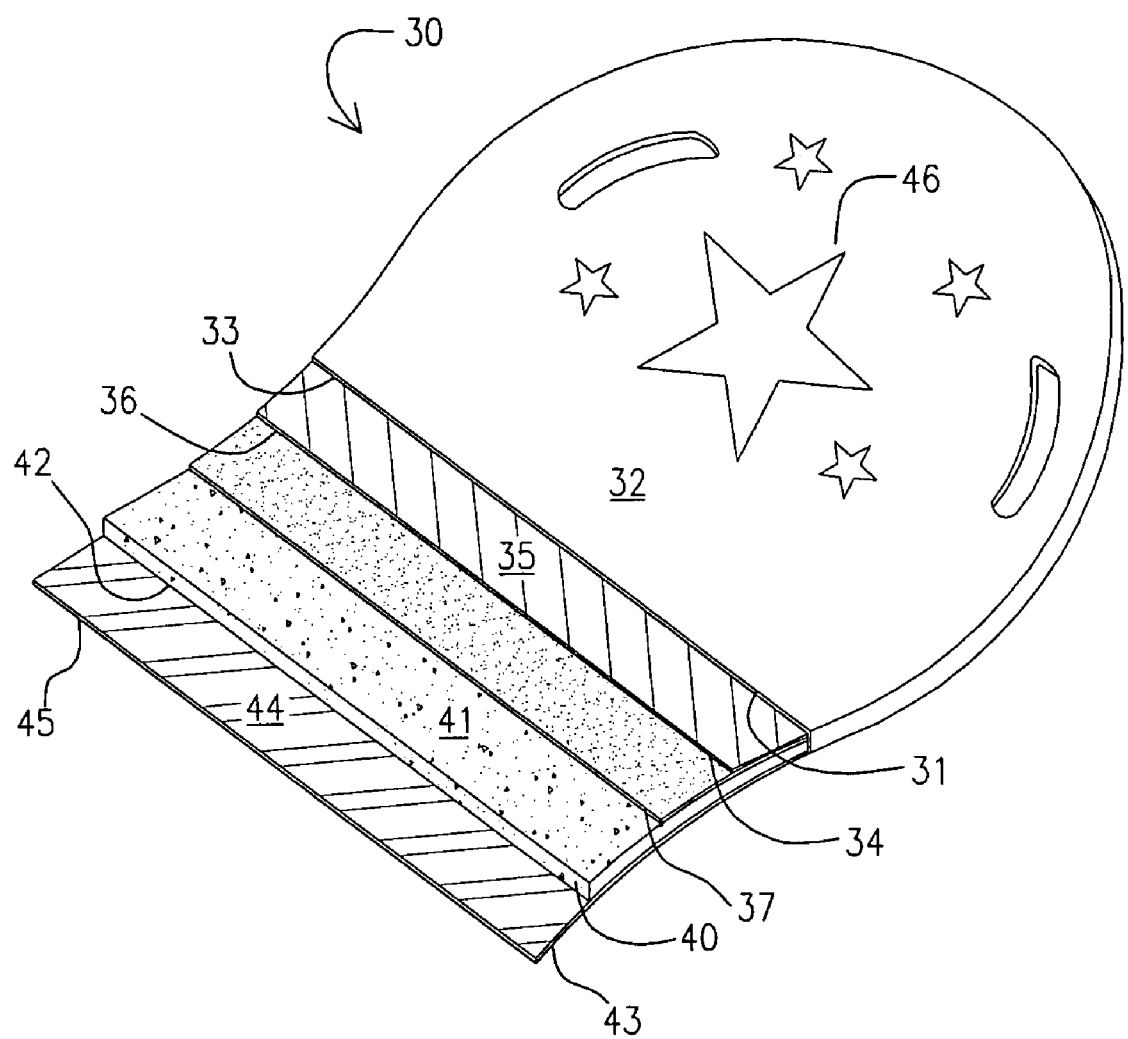
FIG. 3 is a perspective and partial sectional view of a second embodiment of the sports floor.
Figure 4:
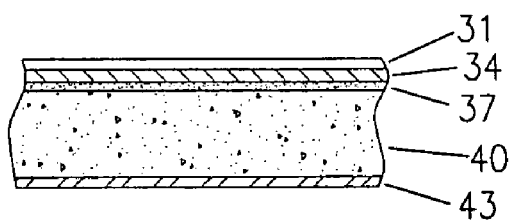
FIG. 4 is a partial vertical sectional view of the sports board shown in FIG. 3.

FIGS. 3-4 show a second embodiment 30. In this embodiment, board 30 has five laminated layers rather than four. Layer 31 is of the same structure and composition as layer 16 in the first embodiment 15. Layer 34 is polyethylene film. Layer 34 has a thickness of between 0.01 and 0.15 mm, and preferably a thickness of 0.07 mm. Layer 34 has a density in the range of 0.91 to 0.98 g/cm$^3$, and preferably a density of 0.95 g/cm$^3$. Layers 37, 40 and 43 are of the same structure and composition as layers 20, 23 and 26, respectively, of the first embodiment 15.

Figure 11:
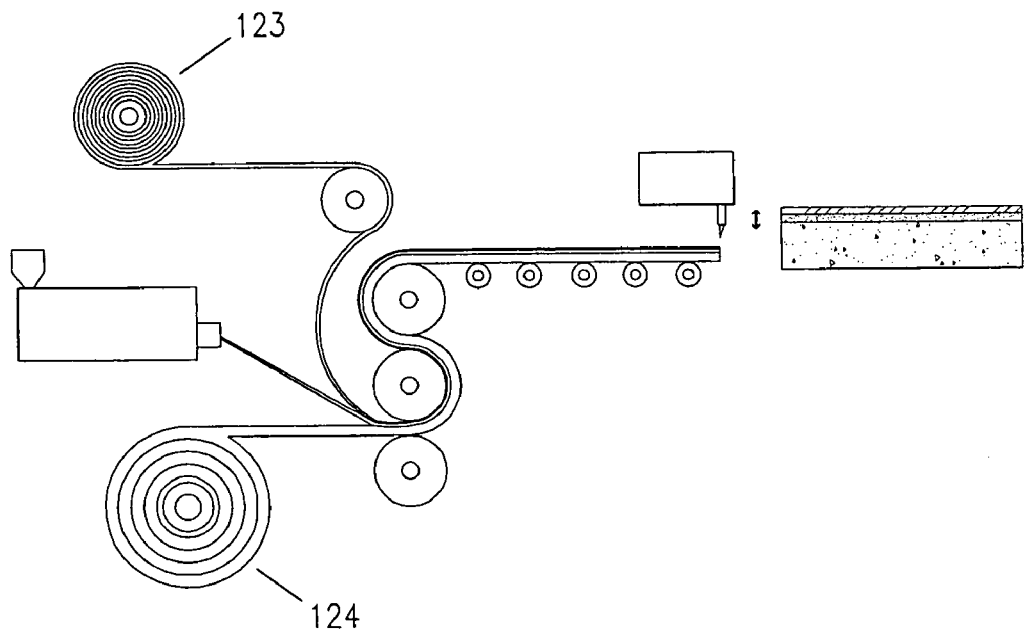
FIG. 11 is a schematic showing the process by which a film layer is bonded to a foam layer with an adhesive resin of the preferred embodiments.

Sports board 30 is formed in a series of steps. First, layer 31 is imprinted with the desired graphics using a conventional imprinting procedure. Layer 34 is then laminated to surface 33 of layer 31 to form a laminate film layer 31/34. As shown in FIG. 11, laminate film layer 31/34 is then fed from a top roll 123 and layer 40 is fed from bottom roll 124. As laminate layer 31/34 and layer 40 are fed from rolls 123 and 124, respectively, resin 37 is extruded, using a conventional extrusion process, between surface 36 of layer 34 and surface 41 of layer 40 to form a laminated sheet of layers 31, 34, 37 and 40. Layer 43 is then heat laminated to surface 42 of laminated sheet 31/34/37/40 using a conventional heat lamination method, thereby forming the fully-laminated sheet 30. This laminated sheet is then cut and configured to the desired shape.

Figure 5:
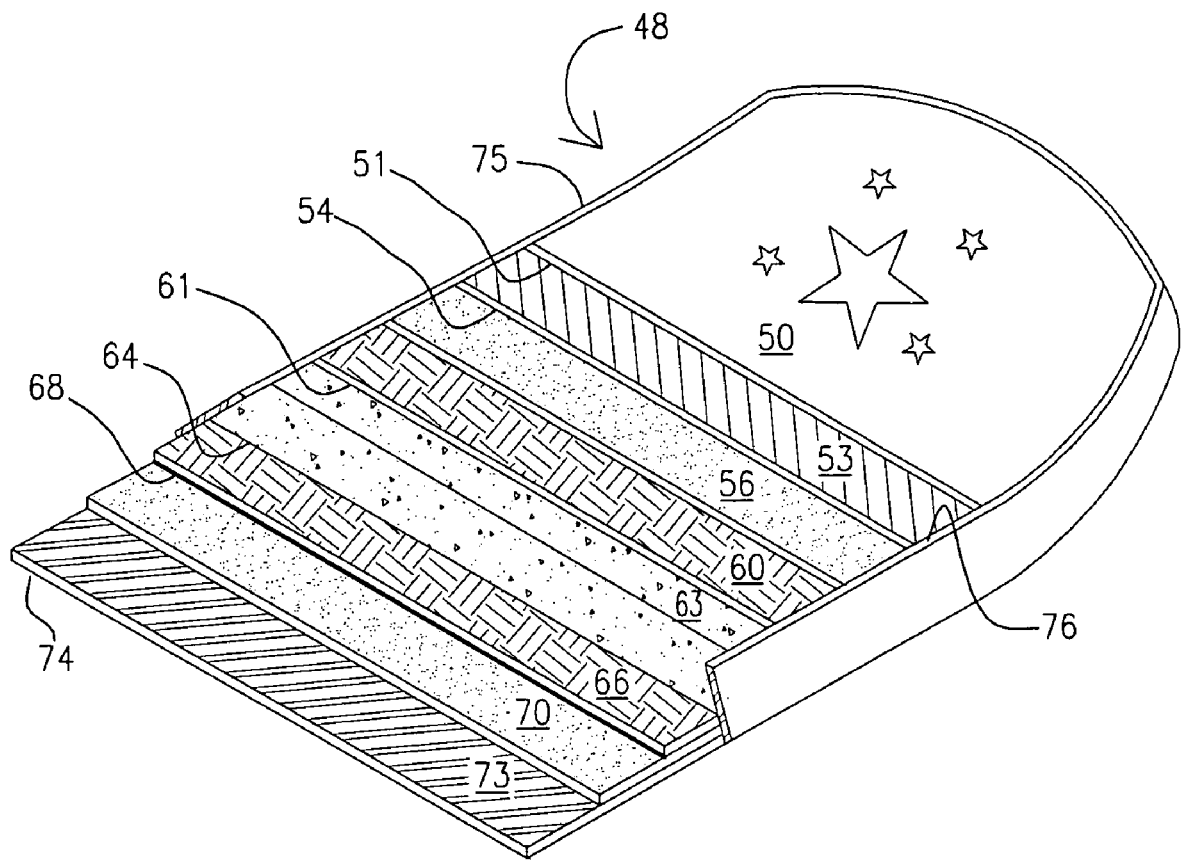
FIG. 5 is a perspective and partial sectional view of a third embodiment of the sports board.
Figure 6:
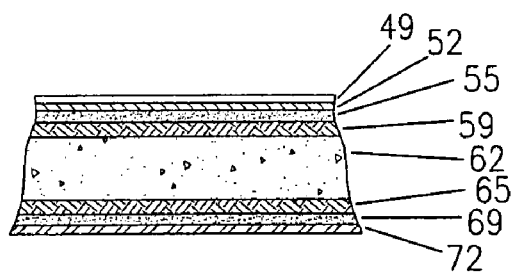
FIG. 6 is a partial vertical sectional view of the sports board shown in FIG. 5.

FIGS. 5-6 show a third embodiment 48. In this embodiment, board 48 has eight laminated layers. Layers 49, 52 and 55 are of the same structure and composition as Layers 31, 34 and 37, respectively, of the second embodiment 30.

Layer 59 is polyethylene foam. Layer 59 has a thickness of between 1 and 5 mm, and preferably a thickness of 3 mm. Layer 59 has a density in the range of 4 to 8 lb/ft$^3$, and preferably a density of 6 lb/ft$^3$.

Layer 62 is polyethylene foam. Layer 62 has a thickness of between 0.5 inches and 2 inches, and preferably a thickness of 1 inch. Layer 62 has a density in the range of 1.6 to 4 lb/ft$^3$, and preferably a density of 2.2 lb/ft$^3$.

Layer 65 is of the same structure and composition as layer 59.

Layer 69 is of the same structure and composition as layer 52 and layer 72 is of the same structure and composition as layer 49.

Sports board 48 is formed in a series of steps. First, layer 49 is imprinted with the desired graphics using a conventional imprinting procedure. Layer 52 is then laminated to surface 51 of layer 49 to form a laminate film layer 49/52. As shown in FIG. 11, laminate film layer 49/52 is then fed from a top roll 123 and layer 59 is fed from bottom roll 124. As laminate layer 49/52 and layer 59 are fed from rolls 123 and 124, respectively, hot resin 55 is extruded, using a conventional extrusion process, between surface 54 of layer 52 and surface 60 of layer 59 to form a top laminate sheet of layers 49, 52, 55, and 59. Next, again with reference to FIG. 11, film layer 72 is then fed from a top roll 123 and layer 65 is fed from bottom roll 124. As layer 72 and layer 65 are fed from rolls 123 and 124, respectively, hot resin 69 is extruded, using a conventional extrusion process, between surface 73 of layer 72 and surface 68 of layer 65 to form a bottom laminate sheet of layers 65, 69 and 72. These laminates are then cut and configured to the desired shape and size. Surface 61 of top laminate 59/55/52/49 is then heat-laminated to the top surface 63 of core 62 using a conventional heat laminating method, and surface 66 of bottom laminate 65/69/72 is then heat-laminated to the bottom surface 64 of core 62 using a conventional heat laminating method, thereby forming the fully-laminated board 48.

As shown in FIG. 5, polyethylene foam strips 75 and 76 are then heat laminated to cover the side edges of laminated layers 49, 52, 55, 59, 62, 65, 69 and 72. Strips 75 and 76 have a thickness of between 2 and 6 mm, and preferably a thickness of 4.5 mm. Strips 75 and 76 have a density in the range of 4 to 8 lb/ft$^3$, and preferably a density of 6 lb/ft$^3$.

Figure 7:
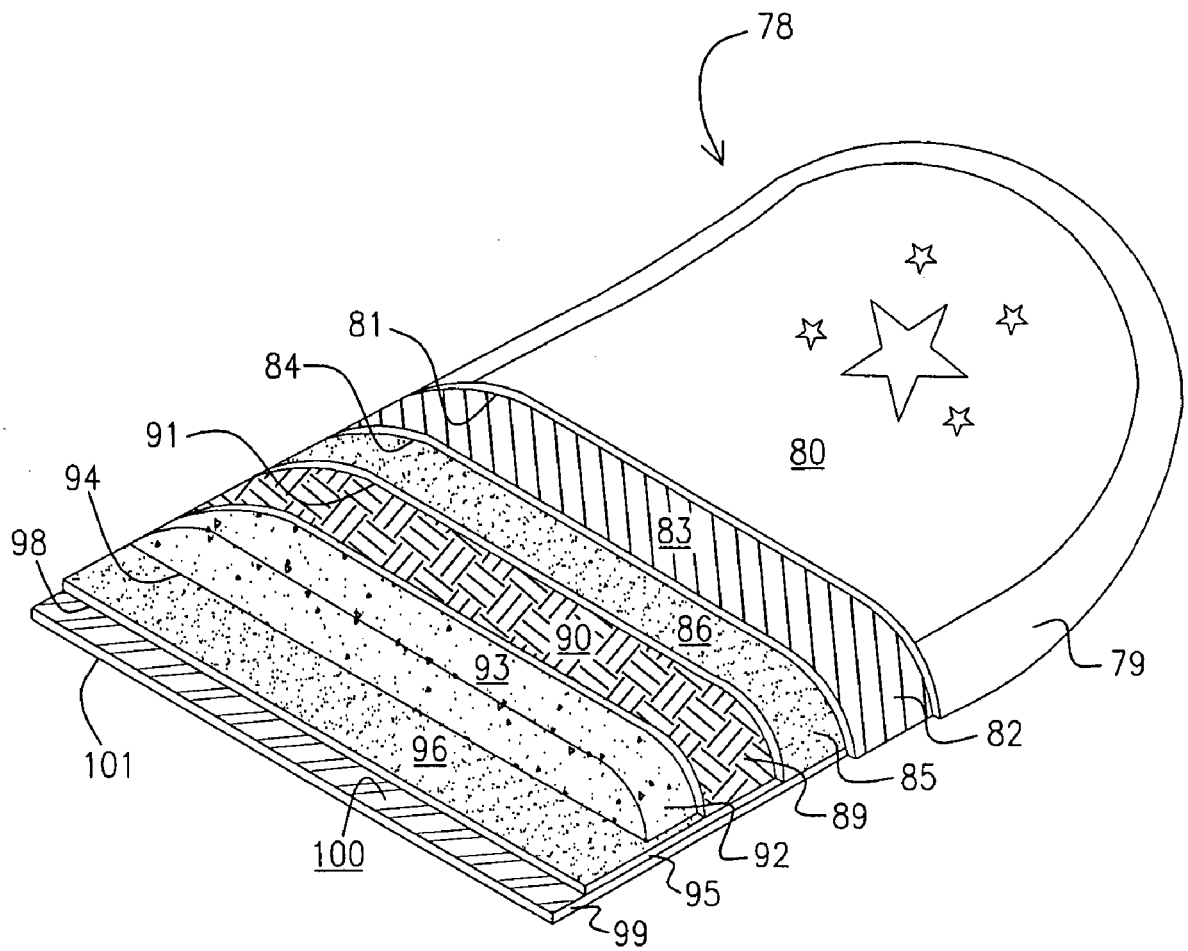
FIG. 7 is a perspective and partial sectional view of a fourth embodiment of the sports board.
Figure 8:
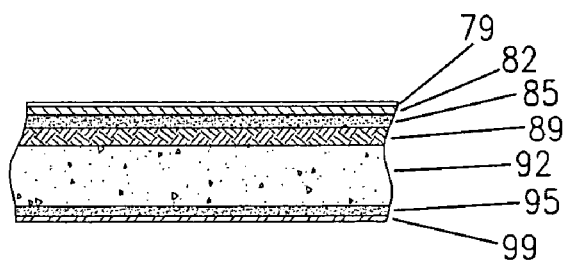
FIG. 8 is a partial vertical sectional view of the sports board shown in FIG. 7.

FIGS. 7-8 show a fourth embodiment 78. In this embodiment, board 78 has seven laminated layers. Layers 79, 82, 85, 89 and 92 are of the same structure and composition as layers 49, 52, 55, 59 and 62, respectively, and layers 95 and 99 are of the same structure and composition as layers 69 and 72, respectively, of board 48. However, sports board 78 does not include the foam backing layer 65 of board 48. The versatility of the adhesive resin allows for the bonding between different foams as well as between different films and foams.

Sports board 78 is formed in a series of steps. First, layer 79 is imprinted with the desired graphics using a conventional imprinting procedure. Layer 82 is then laminated to surface 81 of layer 79 to form a laminate film layer 79/82. As shown in FIG. 11, laminate film layer 79/82 is then fed from a top roll 123 and core 92 is fed from bottom roll 124. As laminate 79/82 and layer 89 are fed from rolls 123 and 124, respectively, hot resin 85 is extruded, using a conventional extrusion process, between surface 84 of layer 82 and surface 90 of layer 89 to form a top laminate sheet of layers 79, 82, 85 and 89. Next, with reference to FIG. 12, film layer 99 is fed from a bottom roll 125 and hot resin 95 is extruded and with pressure applied to surface 100 of layer 99 to form a bottom laminate of layers 95 and 99. This bottom laminate 95/99 is then turned over and, with the application of heat and pressure, is laminated to surface 94 of core 92. The resulting laminate 92/95/99 is then cut and configured to the desired shape. Surface 91 of top laminate 79/82/85/89 is then heat-laminated to the top surface 93 of the shaped core 92 using a conventional heat laminating method, thereby forming the fully-laminated board 78. Layers 79, 82, 85 and 89 are cut and configured to wrap-around and cover the sloped edge of layer 92 and the straight edges of layers 95 and 99 to form a contoured side to board 78. This embodiment does not include the separate side strips 75 and 76 of the third embodiment 48.

Figure 9:
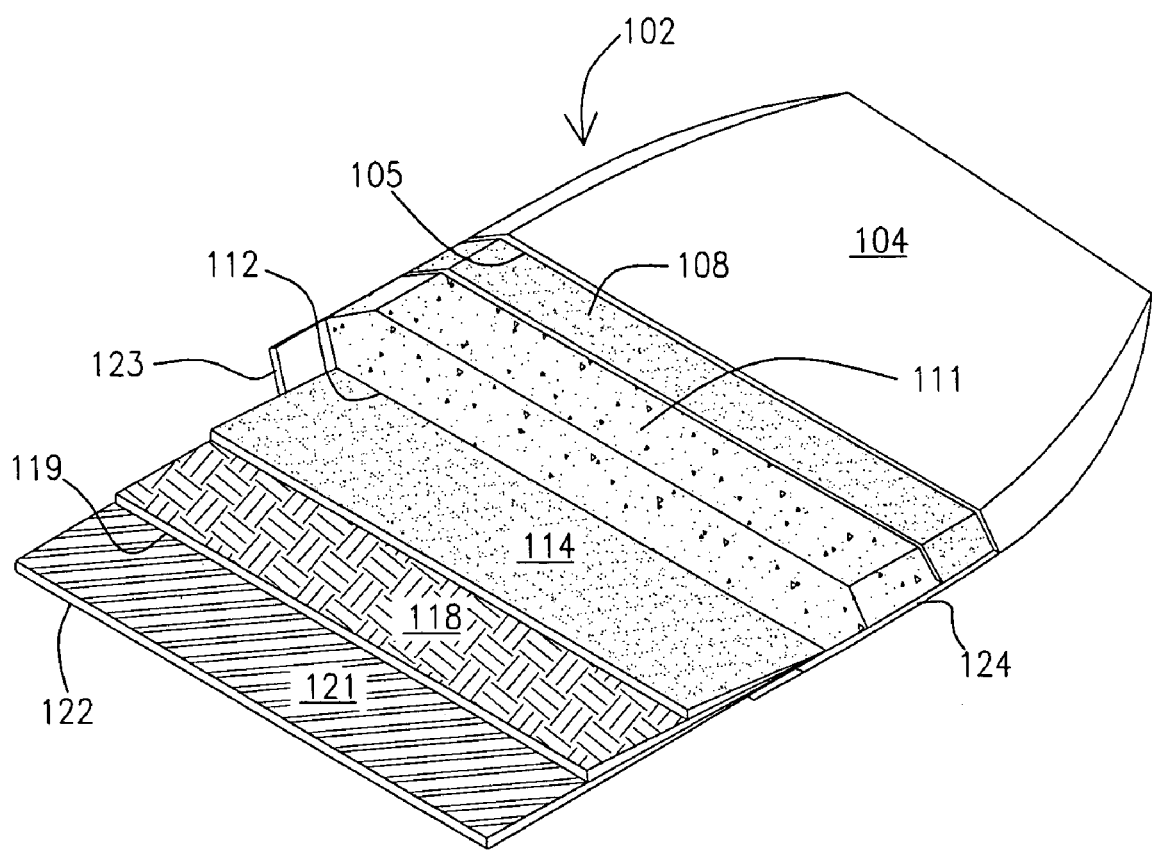
FIG. 9 is a perspective and partial sectional view of a fifth embodiment of the sports board.
Figure 10:
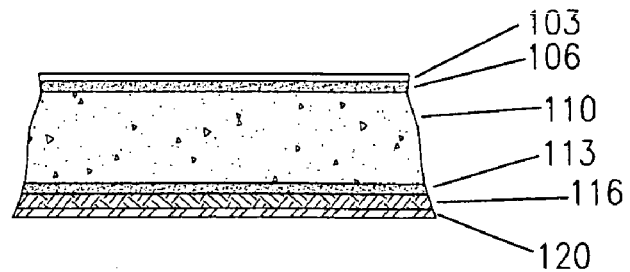
FIG. 10 is a partial vertical sectional view of the sports board shown in FIG. 9.

FIGS. 9-10 show a fifth embodiment 102. In this embodiment, board 102 has six laminated layers.

Layer 103 is polyethylene foam. Layer 103 has a thickness of between 2 and 8 mm, and preferably a thickness of 4.5 mm. Layer 103 has a density in the range of 4 to 10 lb/ft$^3$, and preferably a density of 7 lb/ft$^3$.

Layer 106 is of the same structure and composition as layer 55 in the fourth embodiment.

Layer 110 is non-polyethylene foam. In the preferred embodiment, layer 110 is polystyrene foam. However, it is contemplated that other types of foam may be used, such as polypropylene foam. Layer 110 has a thickness of between 1 and 2.5 inches, and preferably a thickness of 2.125 inches. In the preferred embodiment, layer 110 is polystyrene foam and has a density in the range of 1.0 to 2.5 lb/ft$^3$, and preferably a density of 1.5 lb/ft$^3$. If polypropylene foam is used, layer 110 would have a density in the range of 1.5 to 3 lb/ft$^3$, and preferably a density of 1.9 lb/ft$^3$.

Layer 113 is of the same structure and composition as layer 106.

Layer 116 is polyethylene foam. Layer 116 has a thickness of between 1 and 5 mm, and preferably a thickness of 3 mm. Layer 116 has a density in the range of 4 to 8 lb/ft$^3$, and preferably a density of 6 lb/ft$^3$.

Layer 120 is polyethylene film. Layer 120 has a thickness of between 0.2 and 1.5 mm, and preferably a thickness of 0.35 mm. Layer 120 has a density in the range of 0.91 to 0.98 g/cm$^3$, and preferably a density of 0.95 g/cm$^3$.

Figure 13:
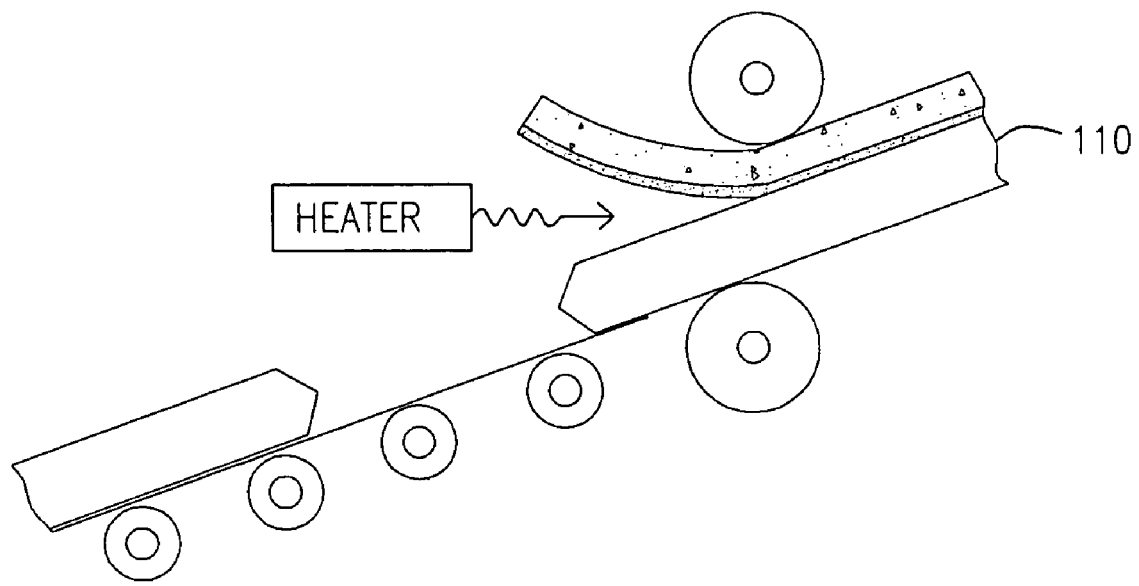

Sports board 102 is formed in a series of steps. First, polyethylene foam layer 116 is heat laminated to film layer 120 using conventional heat laminating methods. As shown in FIGS. 12 and 13, laminate 116/120 is then unrolled from a bottom roll 125 and hot resin 113 is extruded and with pressure applied to surface 118 of layer 116 to form a bottom laminate of layers 113, 116 and 120. This bottom laminate 113/116/120 is then turned over and, with the application of heat and pressure, is laminated to the bottom surface 112 of a pre-formed core 110, as shown in FIG. 13. Next, again with reference to FIG. 12, polyethylene foam layer 103 is unrolled from a bottom roll 125 and hot resin 106 is extruded and with pressure applied to surface 105 of layer 103 to form a top laminate of layers 103 and 106. This top laminate 103/106 is then heat laminated to surface 111 of core layer 110 as shown in FIG. 13, thereby forming the fully-laminated board 102. The top laminate 103/106 is cut and configured to wrap-around and cover the inclined edges of core layer 110. This embodiment also includes two separate side strips 123 and 124 of polyethylene foam which are applied with hot resin, using the same method as the application of resin 106 to layer 103, and then heat laminated to cover the lower inclined side edges of core layer 110. Side strips 123 and 124 have a thickness of between 1 and 5 mm, and preferably a thickness of 3 mm. Side strips 123 and 124 have a density in the range of 4 to 8 lb/ft$^3$, and preferably a density of 6 lb/ft$^3$.

The present invention contemplates that many changes and modifications may be made. Therefore, while the presently-preferred forms of the improved sports board have been shown and described, and several modifications thereof discussed, persons skilled in this art will readily appreciate that various additional changes and modifications may be made without departing from the spirit of the invention, as defined and differentiated by the following claims.

What is claimed is:

1. A sports board comprising:
  a polymer film layer consisting of polyethylene and having an outer surface and an inner surface and having a graphic image printed on said inner surface and visible on said outer surface;
  an expanded foam layer consisting of polystyrene and having first and second outer surfaces;
  an adhesive resin layer consisting of an anhydride-modified ethylene vinyl acetate polymer and bonded directly to said graphic imprinted inner surface of said film layer and said first surface of said foam layer;
  said film layer and said foam layer forming at least two layers of a laminated recreational sports board; and
  said film layer forming an outermost layer of said sports board.

2. The board set forth in claim 1, wherein said film layer has a thickness of between about 0.02 millimeters and about 0.15 millimeters.

3. The board set forth in claim 1, and further comprising a polyethylene film layer bonded to said second outer surface of said foam layer.

4. The board set forth in claim 1, wherein said polystyrene foam layer has a density between 1.0 to 2.5 lb/ft$^3$.

5. A sports board comprising:
  a film layer consisting of polyethylene and having an outer surface and an inner surface and having a graphic image printed on said inner surface and visible on said outer surface
  a foam layer consisting of polyethylene and having an outer surface and an inner surface;
  a first adhesive resin layer consisting of an anhydride-modified ethylene vinyl acetate polymer and bonded directly to said graphic imprinted inner surface of said polyethylene film layer and said outer surface of said polyethylene foam layer;
  a non-polyethylene foam layer consisting of polystyrene and having first and second outer surfaces;
  a second adhesive resin layer consisting of an anhydride-modified ethylene vinyl acetate polymer and bonded directly to said inner surface of said polyethylene foam layer and said first outer surface of said non-polyethylene foam layer;
  said polyethylene film layer, said polyethylene foam layer and said non-polyethylene foam layer forming at least three layers of a laminated recreational sports board; and
  said film layer forming an outermost layer of said sports board.

6. The board set forth in claim 5, and further comprising:
  a second polyethylene foam layer having an outer surface and an inner surface; and
  a third anhydride-modified ethylene vinyl acetate resin layer bonded to said inner surface of said second polyethylene foam layer and said second outer surface of said non-polyethylene foam layer.

7. The board set forth in claim 6, and further comprising:
  a polyethylene film layer having an inner surface and an outer surface;
  said inner surface of said polyethylene film layer bonded to said outer surface of said second polyethylene foam layer.

8. The board set forth in claim 7, wherein said polyethylene film layer has a thickness of between 0.2 and 1.5 mm.

9. The board set forth in claim 5, wherein said non-polyethylene foam layer has a thickness between 1 and 2.5 inches.

10. The board set forth in claim 5, wherein said polyethylene foam layer has a thickness between 1 and 5 mm.

* * * * *